(12) United States Patent
Freitas (10) Patent No.: US 11,053,173 B2
(45) Date of Patent: Jul. 6, 2021

(54) PROCESS FOR FORMING A PRODUCT SOLUTION FROM POULTRY WASTE DIGESTATE

(71) Applicant: CleanBay Renewables LLC, Princess Anne, MD (US)

(72) Inventor: Shawn Freitas, Albany, OR (US)

(73) Assignee: CLEANBAY RENEWABLES LLC, Princess Anne, MD (US)

(*) Notice: Subject to any disclaimer, the term of this patent is extended or adjusted under 35 U.S.C. 154(b) by 118 days.

(21) Appl. No.: 16/487,742

(22) PCT Filed: Feb. 23, 2018

(86) PCT No.: PCT/US2018/019496
§ 371 (c)(1),
(2) Date: Aug. 21, 2019

(87) PCT Pub. No.: WO2018/156940
PCT Pub. Date: Aug. 30, 2018

(65) Prior Publication Data
US 2020/0231512 A1 Jul. 23, 2020

Related U.S. Application Data

(60) Provisional application No. 62/462,751, filed on Feb. 23, 2017.

(51) Int. Cl.
*C05F 3/00* (2006.01)
*C05G 1/00* (2006.01)
(Continued)

(52) U.S. Cl.
CPC .................. *C05F 1/00* (2013.01); *C05B 9/00* (2013.01); *C05B 15/00* (2013.01); *C05C 11/00* (2013.01);
(Continued)

(58) Field of Classification Search
None
See application file for complete search history.

(56) References Cited

U.S. PATENT DOCUMENTS 4,400,315 A  8/1983  Thomas
6,521,129 B1  2/2003  Stamper et al.
(Continued)

FOREIGN PATENT DOCUMENTS

CN  104478185 B  8/2016
DK  2176177 T3  4/2012
(Continued)

OTHER PUBLICATIONS

International Search Report issued in International Application No. PCT/US2018/019496, dated Apr. 30, 2018, 2 pages.
(Continued)

*Primary Examiner* — Wayne A Langel
(74) *Attorney, Agent, or Firm* — Sterne, Kessler, Goldstein & Fox P.L.L.C.

(57) ABSTRACT

Disclosed are methods and systems for the conversion of poultry waste into useful products. Some embodiments are directed to a process for forming a product solution from poultry waste. The process includes providing a feedstock that contains greater than 60 percent poultry waste, and anaerobically digesting the feedstock to produce a digestate that has a solids content of about 5% to about 15% by weight. The process also includes separating and classifying the digestate into multiple high solids fractions and a first filtrate. The process also includes adding the high solids fractions to an acid solution to form a slurry that is then separated and classified into multiple second solids fractions and a second filtrate. The process also includes clarifying the first and second filtrates to produce a first and a second
(Continued)

centrate. The process also includes mixing the first centrate with the second centrate to form the product solution.

23 Claims, 5 Drawing Sheets

(51) Int. Cl.
*C05F 17/00* (2020.01)
*C05B 9/00* (2006.01)
*C05G 5/23* (2020.01)
*C05F 1/00* (2006.01)
*C05F 17/90* (2020.01)
*C05F 17/80* (2020.01)
*C05B 15/00* (2006.01)
*C05C 11/00* (2006.01)

(52) U.S. Cl.
CPC .............. *C05F 3/00* (2013.01); *C05F 17/00* (2013.01); *C05F 17/80* (2020.01); *C05F 17/989* (2020.01); *C05G 1/00* (2013.01); *C05G 5/23* (2020.02)

(56) References Cited

U.S. PATENT DOCUMENTS

| | | | |
|---|---|---|---|
| 8,673,046 B1 | 3/2014 | Szogi et al. | |
| 2008/0283468 A1 | 11/2008 | Logan et al. | |
| 2009/0193863 A1 | 8/2009 | Szogi et al. | |
| 2009/0194476 A1 | 8/2009 | Baur | |
| 2010/0136629 A1* | 6/2010 | Li | C05F 7/00 435/72 |
| 2010/0170845 A1 | 7/2010 | Baur | |
| 2013/0019645 A1* | 1/2013 | Crabtree | C05F 3/00 71/21 |
| 2013/0283872 A1* | 10/2013 | Bisson | C05C 11/00 71/21 |
| 2015/0008181 A1 | 1/2015 | Bassani et al. | |
| 2015/0259259 A1 | 9/2015 | Bhalla et al. | |
| 2015/0329399 A1 | 11/2015 | Kumar et al. | |

FOREIGN PATENT DOCUMENTS

| | | |
|---|---|---|
| EP | 3 181 524 A1 | 6/2017 |
| KR | 10-2014-0134989 A | 11/2014 |
| SI | 2429674 T1 | 3/2016 |
| WO | WO 2013/028776 A1 | 2/2013 |
| WO | WO 2013/133703 A1 | 9/2013 |
| WO | WO 2017/080565 A1 | 5/2017 |

OTHER PUBLICATIONS

Yilmazel et al., "Nitrogen and phosphorus recovery from anaerobic co-digestion residues of poultry manure and maize silage via struvite precipitation", Waste Management & Research, vol. 31, No. 8, pp. 792-804, Aug. 2013.
Coopelband, et al., "Biogenic Phosphate Minerals in Manure: Implications for Phosphorus Loss to Surface Waters", Environmental Science & Technology, American Chemical Society, vol. 36, No. 23, pp. 5075-5082, Nov. 2, 2002.
Hunger, et al., "Evidence for Struvite in Poultry Litter: Effect of Storage and Drying", Journal of Environmental Quality, vol. 37, pp. 1617-1625, Jul.-Aug. 2008.
Sartorius, "Lead Market Potential for Phosphorus Recycling Technologies in Germany", 4th German-Chinese Conference on Technical Innovation and Management, Innovation of Green Growth, pp. 1-18, Sep. 26-29, 2011, Beijing, PR China.
Kataki, et al., "Phosphorus Recovery as Struvite from Farm, Municipal and Industrial Waste: Feedstock Suitability, Methods and Pre-Treatments", Waste Management, vol. 49, pp. 437-454, 2016.
Muster, et al., "Towards Effective Phosphorus Recycling from Wastewater: Quantity and Quality", Chemosphere, Science for Environmental Technology, vol. 91, pp. 676-684, 2013.
Brand-Klibanski, et al., "Comment on 'Formation of Hydroxyapatite and Inositol Hexakisphosphate in Poultry Litter During the Composting Period: Sequential Fractionation, P K-edge XANES and Solution $^{31}$P NMR Investigations'", Environmental Science & Technology, American Chemical Society, vol. 48, pp. 9955-9956, 2014.
Hashimoto et al., "Formation of Hydroxyapatite and Inositol Hexakisphosphate in Poultry Litter During the Composting Period: Sequential Fractionation, P K-edge XANES and Solution $^{31}$P NMR Investigations", Environmental Science & Technology, American Chemical Society, vol. 48, pp. 5486-5492, 2014.
Nieminen, "Phosphorus Recovery and Recycling from Municipal Wastewater Sludge", A Master of Science Thesis, Submitted for inspection in Espoo, May 7, 2010, pp. 1-111.
Toor, et al., "Phosphorus Solubility in Poultry Litters and Granulates: Influence of Litter Treatments and Extraction Ratios", American Society of Agricultural and Biological Engineers, vol. 50, No. 2, pp. 533-542, 2007, ISSN 0001-2351.
Niewersch, et al., "Sustainable Sewage Sludge Management Fostering Phosphorus Recovery and Energy Efficiency", P-REX, Project Supported by the European Commission within the Seventh Framework Programme Grant agreement No. 308645, pp. 1-67, 2013, 2014.
Herzel, et al., "P-Recovery Technologies and Products", Phosphorus Recycling from Prototype to Market, University of Applied Sciences and Arts, Northwestern Switzerland, P-REX Workshop in Amsterdam, Nov. 6, 2015, pp. 1-21.
EPO Communication, Supplementary European Search Report, and Annex to the European Search Report issued in European Patent Application 18 75 8521, dated Dec. 2, 2020.

* cited by examiner

PROCESS FOR FORMING A PRODUCT SOLUTION FROM POULTRY WASTE DIGESTATE

BACKGROUND OF THE INVENTION

Field of the Invention

The present disclosure relates to converting poultry waste to useful products. Disclosed are processes and a system for bioconversion and chemical conversion of poultry waste into agricultural dressings and fertilizers.

Background Art

Fertilizer products can generally comprise organic or inorganic materials of natural or synthetic origin that can supply one or more essential nutrients to plants. In varying proportions, fertilizer products can generally provide one or more primary nutrients, such as, for example, nitrogen (N), phosphorus (P), and potassium (K); optionally one or more secondary nutrients, such as, for example, calcium (Ca), magnesium (Mg), and sulfur (S); and optionally one or more micronutrients, such as, for example, boron (B), chlorine (Cl), copper (Cu), iron (Fe), manganese (Mn), molybdenum (Mb), zinc (Zn), and nickel (Ni).

Struvite can be a marketable product that can be used as a timed release, slow release, or controlled release fertilizer. Methods for producing struvite from various sources, such as wastewater, manure, etc., have been previously described. Poultry manure includes high contents of minerals that can potentially serve as primary nutrients. Poultry waste has a very different composition compared to wastewater or waste from mammals, for example, cattle. A need exists for the efficient treatment of poultry waste on a large scale to provide useful products, in particular, a product solution that can be further used to prepare struvite, as well as field dressings with reduced soluble minerals.

BRIEF SUMMARY OF THE INVENTION

The present disclosure relates to conversion of poultry waste into useful products. One object of the disclosure is to extract phosphorous, magnesium, and nitrogen from poultry waste digestate to form a product solution that can be used in the efficient precipitation of struvite.

A first embodiment of the disclosure is directed to a process for forming a product solution from poultry waste. The product solution is a highly clarified solution of phosphorus and nitrogen that is suitable as a starting material solution for struvite formation. The process includes providing a feedstock that contains greater than 60 percent poultry waste. This feedstock is anaerobically digested. The anaerobic digestion produces a digestate that has a solids content of about 5 to about 15 percent by weight. The digestate is separated and classified into multiple high solids, phosphorus rich fractions; and a nitrogen rich first filtrate having a basic pH and a high buffering capacity. The high solids, phosphorus rich fractions are combined and thereafter acidified, for example, by adding the high solids, phosphorus rich fraction to an acid solution with stirring to form a slurry having a pH of between about 3.5 and about 5.0. Afterwards, the slurry is separated and classified again into multiple solids fractions and a second filtrate. Afterwards, the first filtrate is chemically treated and clarified and/or filtered to form a first centrate and the second filtrate is chemically treated and clarified and/or filtered to form a second centrate. The first centrate is then mixed with the second centrate to form the product solution. In some embodiments, the first centrate is a buffer solution and the second centrate is an acid solution.

In another embodiment, the product solution is added to a reactor with additional ingredients and under conditions suitable to form struvite.

In one embodiment, the first filtrate in any of the preceding embodiments can have a pH of between about 8 and about 9.

In other embodiments, the high solids fraction in any of the preceding embodiments has a solids content of at least 15% (e.g., at least 25%, at least 40%, or at least 50%) solids and the first filtrate has a solids content of at most 2% solids.

In other embodiments, the second filtrate in any of the preceding embodiments comprises orthophosphate and excess magnesium.

In other embodiments, rotary and forward pressure filtration can be employed in any of the preceding embodiments to separate and classify said digestate into at least one high solids, phosphorus rich fraction; and a nitrogen rich first filtrate. Suitable filtration steps can employ, for example, a rotary screen and other various rotary filters, a membrane filter, or a filter press.

In the embodiments of any of the preceding paragraphs the acid solution employed to acidify the high solids, phosphorus rich fraction can suitably comprise sulfuric acid, citric acid, acetic acid, oxalic acid, phosphoric acid, carbonic acid, hydrochloric acid, nitric acid, or a combination thereof. In one embodiment the acid solution comprises sulfuric acid.

The embodiments of any of the preceding paragraphs may further include stirring the slurry for a period of time prior to separating the slurry.

In still other embodiments, rotary and forward pressure filtration can be employed in any of the preceding embodiments to separate and classify said slurry into multiple second solids fractions and a second filtrate.

Similar to above, the filtration step can employ, for example, rotary screens and filters, a membrane filter, or a filter press.

In any of the embodiments of the preceding paragraphs, the first and second solids fractions can be at least partially dried, and can thereafter be used directly as a soil amendment, or packaged and for use as a soil amendment.

In the embodiments of any of the preceding paragraphs the second solids fraction will preferably be phosphorus lean.

In the embodiments of any of the preceding paragraphs the process can further comprise clarifying the first filtrate to form a first centrate. In some embodiments the first centrate is a buffer solution. The process also includes a clarifying step, wherein the second filtrate is clarified to form a second centrate. In some embodiments, the second centrate is an acid solution. The second clarifying step will suitably reduce the solids level in said second filtrate to less than 0.2% total suspended solids (e.g., less than 0.1% or less than 0.5%).

The embodiments of any of the preceding paragraphs may further include adding a buffer solution or wastewater from a struvite reactor during the step of mixing the first filtrate and second filtrate.

In another embodiment, the embodiments of any of the preceding paragraphs further include adding the product solution to a struvite reactor to precipitate struvite.

The process described in any of the embodiments of the preceding paragraphs can be operated as a continuous, semi-continuous, or batch process.

When a rotary screen is used in the embodiments of any of the preceding paragraphs, the rotary screen may rotate at less than 100 rpm (e.g., less than 75 rpm, less than 50 rpm, or less than 25 rpm).

Another embodiment is to a process for forming a product solution from poultry waste. The process includes forming a poultry waste admixture comprising greater than 80% poultry waste. Then the temperature, pH, and concentration of the admixture are maintained at conditions suitable for anaerobic digestion to produce an anaerobic digestate from the admixture. Then the process involves substantially separating and classifying said digestate feedstock into multiple high solids, phosphorus rich fractions, and a first filtrate that is nitrogen rich and has a basic pH. The process then involves adding the high solids, phosphorus rich fractions to an acid solution with stirring to form a slurry having a pH of between about 3.5 and about 5.0. The process then involves substantially separating and classifying said slurry into multiple second solids fractions and a second filtrate. The process then involves clarifying the first filtrate to form a first centrate and clarifying the second filtrate to form a second centrate. In some embodiments the first centrate is a buffer solution and the second centrate is an acid solution. The process then involves mixing said first centrate with said second centrate to form said product solution.

BRIEF DESCRIPTION OF THE DRAWINGS/FIGURES

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION OF THE INVENTION

Feedstock Preparation

The feedstock is typically poultry waste. Poultry waste for purposes of the present invention means any waste from poultry operations, including broiler operations and layer operations. Poultry may mean any kind of bird kept for the production of eggs, meat, or feathers. The poultry waste can come from poultry of any age, from broiler operations or laying operations. Such waste can include: solid or liquid waste generated from the animals; litter from the animal beds, such as wood shavings, saw dust, straw, peanut hulls, or other absorbent materials; spilled food; animal feathers; and dead animals. Poultry waste is typically a combination of these types of waste.

Poultry waste feedstock for the processes described herein should be provided in a form comprising 60 percent or greater poultry waste. The poultry waste can have a moisture content ranging from about 5% to about 95% or higher. The poultry waste can be a solid, a slurry, or a liquid.

The poultry waste is anaerobically digested. In some embodiments, the poultry waste is anaerobically digested in a multi-stage system that incorporates mixing, grinding, pre-hydrolysis, thermophilic, and mesophilic conditions. The anaerobic digestion produces a solid product. In some embodiments, the solid product of anaerobic digestion is the poultry waste digestate. In some embodiments, the digestate is removed from the anaerobic digester after a concentrating step. In some embodiments, the concentrating step provides a digestate having greater than 5% solids. In one embodiment, the digestate has from about 8% to about 15% solids.

Anaerobic digestion has been employed on dairy and swine operations to convert manure into methane gas. More recently, efforts have been made to adapt methods of thermophilic anaerobic digestion to treating waste from egg laying and broiler poultry operations. For example, U.S. Pat. No. 6,521,129 (the '129 patent) and U.S. Published Appl. No. 2008/0283468 (the '468 application) disclose methods of anaerobically digesting poultry manure and poultry litter. The entirety of the '129 patent and the '468 application are fully incorporated by reference herein. In one embodiment, the poultry anaerobic digestate is produced according to the method described in the '468 application.

Oftentimes poultry litter includes larger woody materials mixed in with the litter. The larger woody material may be removed upstream, prior to digestion. It has been determined that the presence of larger woody materials in the anaerobic digester results in a digestate with highly concentrated reservoirs of phosphorus and nitrogen. The concentration is influenced by the residence time of the woody material in the digester. Once the phosphorus and nitrogen are bound by the woody material, it is impractical and very difficult to remove or extract the phosphorus and nitrogen without combustion or destruction of the organic matrix.

As such, the nutrients (e.g., phosphorus and nitrogen) cannot be easily extracted, making the larger woody materials an unsuitable feedstock for acidification. To avoid this, the larger woody materials may be separated from the feedstock upstream, prior to introduction into the digester. However, due to its nutrient concentration the larger woody material is suitable for various agricultural applications. The nutrients in the woody material release slowly, over long periods of time, which makes this woody material that is removed from the feedstock suitable for various agriculture applications as a time-delayed phosphorus or nitrogen source.

Size Reduction/Homogenation

The digestate can be subjected to size reduction and homogenation to provide a more uniform digestate having a narrower particle size distribution. A solid/liquid grinder can be used to reduce the particle size of the solids. A homogenizer can be used to reduce the particle size of the solids.

The digestate is typically subjected to size reduction because digestate derived from poultry waste generally has a broad particle size distribution that ranges from approximately 0.25 inches to sub-micron. Certain solid-liquid separation steps function with a higher efficiency if the particle size distribution is narrower. Such efficiency allows for more precise design parameters. Whether the digestate undergoes size reduction or homogenation is based various factors, including the type of poultry waste, its residence time in the system, and the limits of any downstream solid-liquid separation technology.

Suspended Solids Classification or Fractionation

In addition to varying particle size, within a given sample of digestate there are different classes of particle size that result in a significant particle size distribution (PSD), and each class of particle size can have varying phosphorous concentrations. The variance in the phosphorus concentration can be significant, and such variance can lead to lower efficiencies in the overall process of forming a product solution.

Identifying these variances allows for the classification and separation of the digestate into streams with lower particle size distribution. Classification allows for the targeting of phosphorus in the digestate through the separation and removal of the particle size classes with the highest phosphorus concentrations. This same classification method can be employed to target additional other nutrients, such as nitrogen, potassium, and micronutrients. As used herein, "micronutrients" includes minerals, vitamins, elements, or other nutrients present in trace amounts. Examples of micronutrients include boron, chlorine, copper, iron, manganese, molybdenum, and zinc.

The objective of this classification step is generate multiple product streams, each with narrow particle size distributions. This classification may be done before, after, or both before and after the acidification and extraction steps. This allows individual particle size distributions to be analyzed and produced as separate products for different agricultural or process applications depending on their respective concentrations of phosphorous, nitrogen, potassium, and other micronutrients. In general, the particle size distribution classes with the highest nutrient concentrations tend to be the supra-colloidal and sub-micron classes. Particles having a diameter of less than 100 μm are targeted because classification of such particles improves the efficiency of the classification and separation.

Primary Solid-Liquid Separation

The digestate derived from poultry waste undergoes a primary solid-liquid separation. This separation typically occurs after size reduction and homogenization. The primary solid-liquid separation results in a liquid fraction of the digestate, or a first filtrate, and a first solid fraction.

The primary solid-liquid separation step provides solids in a dewatered state (first solid fraction). The separation step also produces a low suspended solids liquid (first filtrate). The chemistry of the solids and the liquids in digestate derived from poultry waste is quite different from digestate derived from other feedstock, such as cattle manure.

Owing to the unique chemistry of poultry waste, the first filtrate is basic, with a pH of about 8 to about 9. The first filtrate contains a high level of ammonium carbonate. The first filtrate is useful downstream as a source of nitrogen and as a buffer. However, the high buffering capacity of the first filtrate can be a detriment for any downstream acid-based extractions. High levels of potassium found in the first filtrate provide even additional buffering capacity.

By virtue of the separation, the remaining first solids fraction has a more neutral pH. The pH of the first solids fraction is typically in the range of 6.5-7.5. The first solids fraction typically contains the bulk of the target phosphorous and magnesium in the form of unstable and amorphous salts, some phytates, ammonium salts, and alkali salts. Once the solid fraction of the digestate is suitably separated from the first filtrate, the buffering capacity of the solid fraction is dramatically reduced and efficient acid-based extraction is possible.

The inventors have discovered that the anaerobic poultry digestate in the unseparated state is impractical to use for creating a solution for struvite precipitation due to the amount of acid required to perform the extraction and the corresponding loss of nitrogen. As separated streams, the first solids fraction and the first filtrate of the present invention are both important downstream in the production of a product solution that can be used for the efficient precipitation of struvite. Thus, the primary solid-liquid separation step creates two outputs that are further processed and re-combined downstream in a controlled environment to generate the final product solution.

It is to be understood that any equipment suitable for performing a solid-liquid separation can be used for the primary solid-liquid separation step. In some embodiments, a first separator is used to perform the secondary solid-liquid separation. In some embodiments, a filter, for example a forward pressure filter, is used to perform the solid-liquid separation. In some embodiments, the filter is a vacuum filter. In other embodiments, the filter can be one or more of a rotary screen, a rotary filter, a membrane filter, or a filter press. In some embodiments, the first separator accepts poultry waste digestate with a solids content of at least 5% solids. In some embodiments the first separator accepts poultry waste digestate with a solids content in the range of 8 to 10% solids. In some embodiments, the solid-liquid separation removes enough of the liquid fraction to create a first solids fraction that is composed of a solid moveable by conveyor and a first filtrate with minimal suspended solids In some embodiments, the solids content of the solid fraction is greater than 25%. In some embodiments, the solids content of the first filtrate is no more than 2%.

The first filtrate may be chemically treated to further reduce the total solids concentration. The chemical treatment may include coagulation and flocculation. In some embodiments, organic coagulants and flocculants are used because inorganic coagulants and flocculants (e.g., aluminum and iron) will irreversibly bind to phosphorus, reducing the usable amount of phosphorus in first filtrates.

Organic flocculants come in various charges, charge densities, molecular weights, and forms. Examples of cationic organic flocculants include copolymers of AETAC (N,N-Dimethylaminoethyl Acrylate Methyl Chloride Quaternary), METAC (N,N-Dimethylaminoethyl Methacrylate Methyl Chloride Quaternary), and acrylamides. Examples of anionic organic flocculants include polyacrylamides and copolymers of acrylamide and acrylic acid. Other organic flocculants are natural and include chitosan, alginates, and guar gum. Organic coagulants may comprise various cationic and anionic combinations of polyamines and poly-DADMAC (Polydiallyldimethylammonium chloride), along with melamine formaldehydes and tannins. The coagulant is used to destabilize and overcome the existing surface charges, driving self-assembly of particulates. The flocculant is used to bind these coagulated particulates and add molecular weight to accelerate settling.

Primary Solids Transfer

Following the primary solid-liquid separation, the first solids fraction is acidified. In some embodiments, the first solids fraction is added to an acidic solution. Such suspension in an acid solution supports the extraction of the phosphorous and magnesium and the transfer of these components from the solid to the liquid phase. Controlled transfer of the first solids fraction from the upstream filtration step to the extraction tanks supports efficient stirring and mixing of the first solids fraction and acidified liquids.

The first solids fraction from the primary solid-liquid separation step can be conveyed to one or more extraction tanks. The first solids fraction is typically added to an extraction tank in such a way that the first solids fraction is fully submerged in a liquid. The liquid typically comprises a mixture of water and acid. Adding the first solids fraction to the liquid in one or more extraction tanks ensures that all of the first solids fraction is fully and completely mixed back or dispersed into the liquid.

Primary Solids Extraction

The first solids fraction from the primary solid-liquid separation step is further processed in a solids extraction step. With a majority of the liquid removed, the buffering capacity of the first solids fraction is reduced. The reduction of the buffering capacity enables an efficient acid extraction. The first solids fraction from the primary solid-liquid separation contains the bulk of the target phosphorous and magnesium, unstable and amorphous salts, phytates, ammonium salts, and alkali salts.

The solids extraction step involves soaking the first solids fraction in an acidified aqueous solution. The acidified aqueous solution solubilizes the salts and puts the phosphorous and magnesium into solution, which transfers greater than 50% of phosphorous and magnesium from the first solids fraction to the liquid phase. The solids extraction step provides phosphorus and magnesium for use as downstream reactants, for example as reactants for struvite precipitation.

The first solids fraction may be conveyed to one or more extraction tanks for the solids extraction step. In some embodiments, the first solids fraction is conveyed to three different extraction tanks. Prior to adding the first solids fraction to the one or more extraction tanks, the tanks can be filled with water prior to the solids fraction being added to the tank. In some embodiments the extraction tanks are filled with wastewater from one or more downstream struvite reactors. In some embodiments, the wastewater contains trace amounts of magnesium and ammonia. An acid, such as sulfuric acid, is added to the wastewater in an amount sufficient to reduce the pH of the wastewater to a range of about 3.5 to about 4.5. Useful acids include sulfuric acid, citric acid, acetic acid, oxalic acid, phosphoric acid, carbonic acid, hydrochloric acid, nitric acid, or a combination thereof After the pH of the wastewater is in a range of about 3.5 to about 4.5, the first solids fraction is added to the extraction tanks to form an extraction slurry. The solids fraction can have a solids content of 25% or more. The extraction slurry is typically mixed. The extraction tanks can be equipped with one or more pumps. In some embodiments, the pump is a chopper pump. The chopper pump is suitable for both mixing and pumping. The one or more chopper pumps can maintain agitation and mixing of the slurry.

The slurry has a suspended solids concentration of about 10 to about 20% solids. In some embodiments, additional sulfuric acid is added to the slurry in an amount sufficient to reach a pH of about 4.5. After the pH has reached about 4.5, the slurry remains in the extraction tank for a period of time sufficient to achieve extraction. For instance, a suitable extraction period may be about 4 hours to about 24 hours. In some embodiments, the extraction period is about 4 to about 16 hours. In some embodiments, the extraction period is about 6 to about 8 hours. After the extraction period, the slurry can be pumped out of the tanks.

First Filtrate Polishing

The first filtrate can serve as a downstream source of nitrogen, as a buffer, and as a diluent for creating the product solution. If the level of suspended solids is too high, the functionality of the first filtrate may be reduced. The precipitation of struvite using the product solution may be sensitive to suspended solids. In some embodiments, the first filtrate is polished to reduce the suspended solids content.

Following the primary solid-liquid separation, the first filtrate can be transferred to a first clarifier for polishing. In some embodiments, the first clarifier is a centrifuge. In some embodiments, the first clarifier is a disc stack bowl centrifuge. In some embodiments, the first filtrate is polished using one of an ultrafiltration unit, dissolved air flotation, tubular membrane filter, leaf filter, tubular filter, agitated nutsche filter, tower press, tube press, filter press, screw press, decanter centrifuge, pusher centrifuge, peeler centrifuge, scroll centrifuge, batch centrifuge, inverting basket centrifuge, and hydrocyclone. The first filtrate has no more than 2% solids. The first filtrate polishing produces a first centrate containing no more than 0.1% solids.

In some embodiments, the process is a continuous process. In some embodiments, the process is continuous slug-flow. To accommodate a continuous slug-flow process, in some embodiments, the first centrate is stored for later use in the process. As used herein, "centrate" means the liquid leaving the separator, regardless the type of separator employed.

Secondary Solid-Liquid Separation

The slurry from the acid extraction step is typically processed in a secondary solid-liquid separation step. In some embodiments, a second separator is used to perform the secondary solid-liquid separation. Any suitable equipment for performing a solid-liquid separation can be used. For example, a filter can be used to perform the solid-liquid separation. In some embodiments, the filter is a forward pressure filter. In some embodiments, the separation is done using one of a dissolved air flotation, tubular membrane filter, leaf filter, tubular filter, agitated nutsche filter, tower press, tube press, filter press, screw press, decanter centrifuge, pusher centrifuge, peeler centrifuge, scroll centrifuge, batch centrifuge, inverting basket centrifuge, vacuum filter, and hydrocyclone. In some embodiments, the second separator used in the secondary solid-liquid separation is a different separator from the first separator used in the primary solid-liquid separation. In some embodiments, the second separator used in the secondary solid-liquid separation is the same as the first separator used in the secondary solid-liquid separation. In some embodiments, the same separator is used for both the primary solid-liquid separation and the secondary solid-liquid separation, and the separator is operable under different conditions for each separation.

In some embodiments, the slurry has a solids content of about 10 to about 20% solids. In some embodiments, the secondary separation step separates the slurry into a second filtrate and a second solids fraction. In some embodiments, the solids content of the second solids fraction is greater than 30%. In some embodiments, the solids content of the second filtrate is no more than 2%.

The second filtrate typically comprises solubilized phosphorous. Thus, the second filtrate includes ingredients that can be used for the production of struvite downstream. The second filtrate typically has a solids content of no more than about 2% suspended solids; and typically has a pH of about 4 to about 4.5. The second filtrate also contains a high level of ortho-phosphorous. The second filtrate may also contain measurable levels of magnesium, potassium, calcium, and sodium. The second filtrate contains levels of magnesium, potassium, calcium, and sodium that are about 5 to about 100 times higher than the levels of magnesium, potassium, calcium, and sodium found in the first filtrate.

The second solids fraction has a pH of about 5 to about 6. The second solids fraction contains some residual nitrogen, phosphorous, and alkali species. In some embodiments, the amount of residual nitrogen, phosphorus, and alkali species in the second solids fraction is less than the amount in the solids fraction of the primary solid-liquid separation. In some embodiments, the second solids fraction is discarded. In other embodiments, the second solids fraction undergoes further processing, for example, to be used as a soil amendment.

The second filtrate may be chemically treated to reduce the solids concentration using coagulation and flocculation as described above with respect to the first filtrate.

Secondary Filtrate Polishing

Following the secondary solid-liquid separation, the second filtrate can be transferred to a second clarifier. High levels of suspended solids can reduce the functionality of the second centrate, and a secondary filtrate polishing step is useful to remove suspended solids from the second filtrate. Useful equipment for use as the second clarifier includes centrifuges. In some embodiments, the second clarifier is a disc stack bowl centrifuge. In some embodiments, the second filtrate is polished using one of an ultrafiltration unit, dissolved air flotation, tubular membrane filter, leaf filter, tubular filter, agitated nutsche filter, tower press, tube press, filter press, screw press, decanter centrifuge, pusher centrifuge, peeler centrifuge, scroll centrifuge, batch centrifuge, inverting basket centrifuge, and hydrocyclone. The second clarifier can be the same separator or a different separator from the first clarifier used in the primary filtrate polishing step. In some embodiments, the second clarifier is the same as the first clarifier used in the primary filtrate polishing step. The second filtrate has a solids content of no more than 2% solids. The second filtrate polishing produces a second centrate containing no more than 0.1% solids.

Formation of Product Solution

The product solution is obtained by mixing the first centrate and the second centrate. In some embodiments, the first filtrate and the second filtrate are first polished to form a first centrate and a second centrate. The first and second centrates are then mixed to form the product solution. The pH of the product solution is about 5 to about 6. In some embodiments, the product solution comprises levels of nitrogen and phosphorous sufficient to efficiently precipitate struvite when subjected to precipitating conditions. The pH of the product solution can be adjusted. In some embodiments, a buffer is added. In some embodiments the buffer is one of ammonium hydroxide, sodium hydroxide, potassium hydroxide, and magnesium hydroxide. Similarly, the magnesium concentration of the product solution can be adjusted using a magnesium source. Useful magnesium sources include any magnesium salt capable of dissolving in solution, for example, magnesium hydroxide, magnesium chloride, and magnesium citrate.

In some embodiments, the mixing step involves a small-volume, controlled environment in which to mix the first filtrate and the second filtrate or the first centrate and the second centrate streams. For example, the first centrate and second centrate can be mixed in a mixing tank to form a product solution. In some embodiments, the product solution is pumped to a struvite reactor. In some embodiments, the first centrate and second centrate can be mixed in a struvite reactor.

Struvite Reactor

Typically, once the product solution is obtained, the product solution is added to a struvite reactor. The struvite reactor can be one of a stirred batch reactor, a continuous stirred-tank reactor, a fluidized bed reactor, a fixed-bed catalytic reactor, an electrochemical cell, or an ion exchange column. When the pH in the struvite reactor is adjusted to a pH of about 7 or higher, struvite precipitation becomes kinetically favorable and a high percentage of the ortho-phosphorous, magnesium, and ammonia combine into struvite precipitates, leaving the liquid phase, and entering the solid phase. Residence time, mixing, and surface area are controlled within the struvite reactor to maintain a high efficiency of conversion to struvite. The struvite reactor can be designed to collect the precipitated product and intermittently flush it out of the system for collection. In some embodiments, in the struvite reactor the pH and magnesium levels are increased using ammonium hydroxide for the buffer and a magnesium source such as magnesium hydroxide or magnesium chloride.

Other suitable methods and reactors for production of struvite are disclosed in *Phosphorus recovery as struvite from farm, municipal and industrial waste: Feedstock suitability, methods, and pre-treatments*, which is fully incorporated herein by reference. Sampriti Kataki et al., *Phosphorus recovery as struvite from farm, municipal and industrial waste: Feedstock suitability, methods, and pre-treatments*, 49 Waste Management 437 (2016).

The description above discusses various embodiments of the disclosure. The descriptions of the figures below describe in further detail certain specific embodiments of the disclosure.

Figure 1:
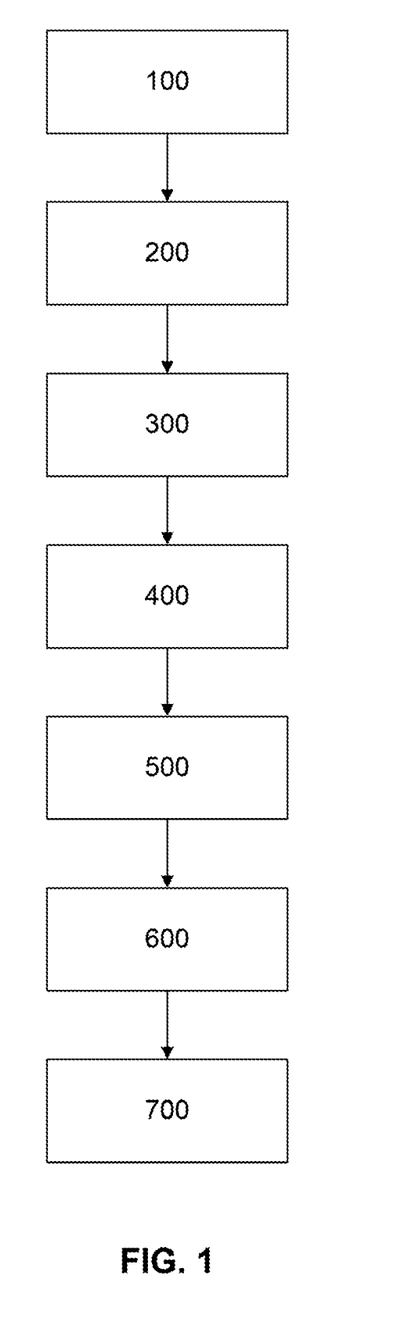
FIG. 1 is a flow chart for an exemplary process for forming product solution.

FIG. 1 shows a process flow chart corresponding to an embodiment of the invention. In this embodiment, feedstock is provided at step 100. The feedstock is greater than 80 percent poultry waste. The poultry waste may be any waste from poultry operations, including broiler operations and layer operations. The poultry waste may come from poultry of any age, from broiler operations or laying operations, or both. The feedstock is anaerobically digested at step 200 to produce a digestate. The digestate is separated at step 300 to produce a first solids fraction and a first filtrate. The first solids fraction has a high solids content of at least 25% and is phosphorus rich. In some embodiments, the first filtrate is nitrogen rich, has a basic pH, and has a buffering capacity higher than expected based on the pH of the incoming poultry litter. At step 400, the solids fraction is added to an acid solution to form a slurry. In some embodiments, the solids fraction is added to one or more tanks containing an acid solution. The acid solution can be made by mixing water, including wastewater from other steps in the process with one of sulfuric acid, citric acid, acetic acid, oxalic acid, nitric acid, and phosphoric acid. The slurry has a pH between about 3.5 and about 5.0. The slurry is mixed for a suitable period of time, for example between 4 and 24 hours. At step 500, the slurry is separated into a second solids fraction and a second filtrate. At step 600, the first filtrate and the second filtrate are each clarified to form a first centrate and a second centrate. At step 700, the first and second centrates are mixed to form a product solution. At step 800, the product solution is added to a struvite reactor and subjected to conditions that will precipitate struvite. In some embodiments, the first centrate and second centrate are mixed in a struvite reactor.

Figure 2:
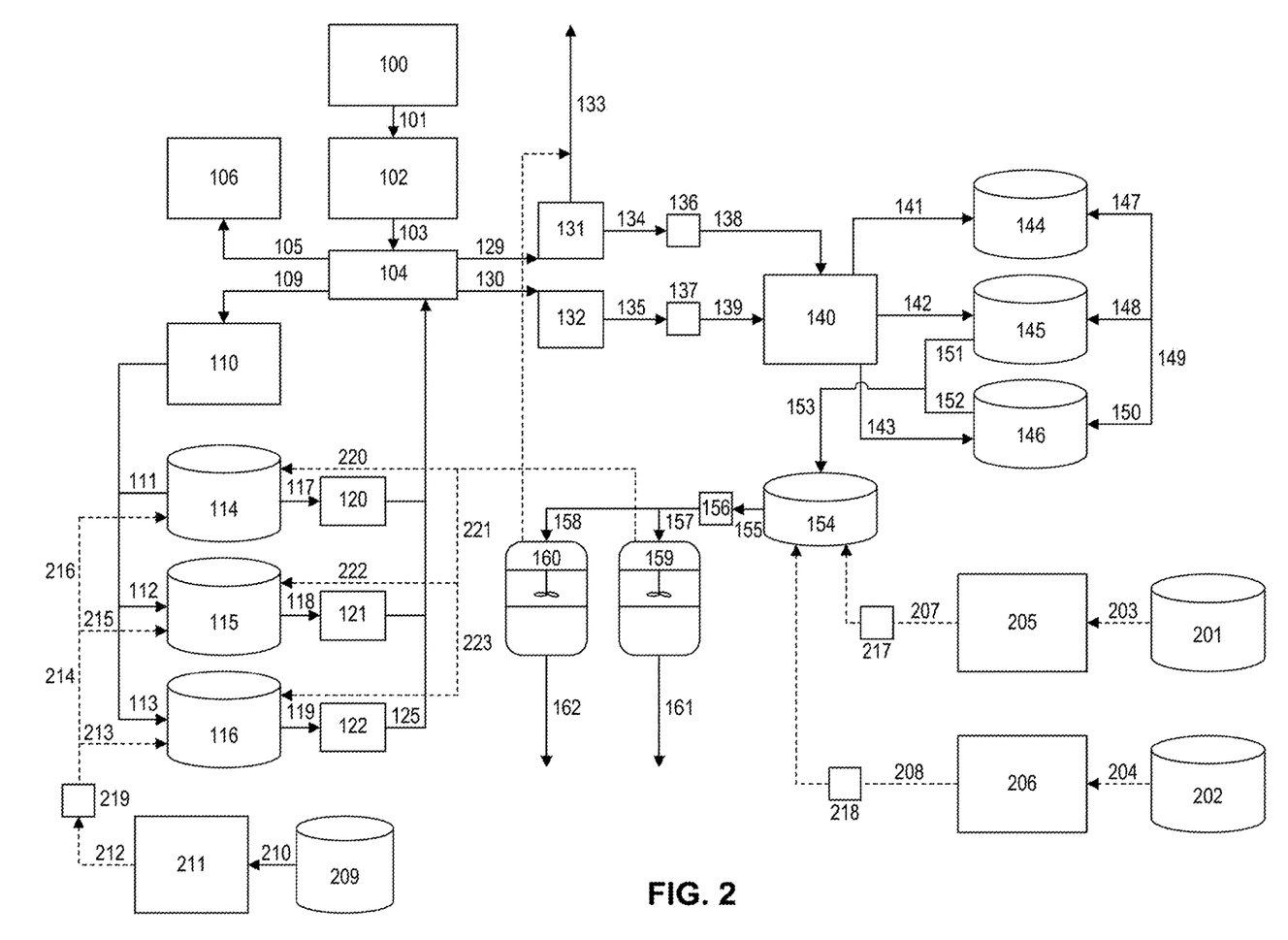
FIG. 2 is a process flow diagram for an exemplary process for forming product solution.

FIG. 2 shows a process flow diagram according to one embodiment of the invention.

In this embodiment, a digestate is pumped to into the process from input 100. The digestate is anaerobically digested poultry waste as described above.

The digestate is fed to grinder pump 102. The digestate comprises a solids content of 8 to 10% solids and has a pH of about 8.5. The digestate can be fed at a rate exceeding 5,000 gallons per day. In some embodiments, the digestate is fed in batches across 4-24 hour increments. In some embodiments, the digestate is fed in batches across 4-24 hour increments. As an example, when the digestate is fed at a rate of 180,000 gallons per day, the process shown in FIG. 2, is capable of feeding the digestate in three 60,000 gallon batches across 8 hour increments. Grinder pump 102 reduces the particle size distribution of the digestate. In some embodiments, grinder pump 102 is a solid/liquid grinder.

After the particle size distribution has been reduced using grinder pump 102, the digestate is fed to separator 104. In some embodiments, separator 104 is a vacuum filter. In some embodiments, the vacuum filter is a horizontal belt. In some embodiments, the vacuum filter is a rotary table. Separator 104 separates the digestate into a first solids fraction and a first filtrate. Following separation, the resulting first filtrate is moved to first filtrate tank 131.

The first solids fraction is moved using conveyor 110 to one or more solids tanks. In some embodiments, conveyor 110 moves the first solids fraction to solids tanks 114, 115, and 116. For example, solids tanks 114, 115, and 116 can each be 60,000 gallon tanks which can be each configured to accept 20,000 gallons per day of the first solids fraction, 20,000 gallons per day of recycled water, and about 250 gallons of acid per day from acid dosing tank 211. The solids fraction comprises a dewatered sludge cake with a moisture content of about 70 to about 75%. In some embodiments, the recycled water is recycled from one or more downstream struvite reactors 159 and 160. Acid is pumped to solids tanks 114, 115, and 116, from acid tank 209 using pump 219. The slurry of the first solids fraction, recycled water, and acid in the solids tank is mixed for about 4 to about 24 hours. In some embodiments, the slurry of the first solids fraction, recycled water, and acid in the solids tank is mixed for about 4 to about 16 hours. In some embodiments, the slurry of the first solids fraction, recycled water, and acid in the solids tank is mixed for about 6 to about 8 hours. In some embodiments, the slurry remains in the solids tank until the slurry reaches a pH of about 4.5.

Following mixing the slurry in the solids tanks 114, 115, and 116, the slurry is pumped to separator 104 using pumps 120, 121, and 122. Separator 104 separates the slurry into a second solids fraction and a second filtrate. In some embodiments, the second solids fraction is stored at soil amendment storage area 106 for later use as a soil amendment. Following separation, the resulting second filtrate is moved to the second filtrate tank 132.

The first filtrate is pumped to separator 140 using pump 136. In some embodiments, separator 140 is a centrifuge. In some embodiments, separator 140 is a disc-stack bowl centrifuge. Separator 140 reduces the solids content of the first filtrate to produce a first centrate. Before separation, the first filtrate has a solids content of about 2%. Following separation using separator 140, the solids content of the first centrate is about 0.1% solids or less. The first centrate has a pH of about 8.5 and a high concentration of ammonium carbonate. In some embodiments, the first centrate is stored in buffer storage tank 144. As an example, buffer storage tank 144 can be configured to store 80,000 gallons of the first centrate.

The second filtrate is pumped to separator 140 using pump 137. Separator 140 reduces the solids content of the second filtrate to produce a second centrate. Before separation, the second filtrate has a solids content of about 2%. The second centrate has a pH of about 5 to about 6. Following separation using separator 140, the solids content of the second centrate is about 0.1% solids or less. In some embodiments, the second centrate is stored in storage tanks 145 and 146.

The product solution is formed by mixing the first centrate and the second centrate. The first centrate and the second centrate are mixed in dosing tank 154 to form the product solution. The product solution is then pumped to struvite reactors 159 and 160 using pump 156. The first centrate and the second centrate can be mixed in the struvite reactors 159 and 160. A buffer dosing tank 205 supplies buffer to the mixture of the first centrate and the second centrate using pump 217. The buffer is stored in buffer tank 201. Magnesium dosing tank 206 supplies magnesium to the mixture of the product solution using pump 218. As an example, as shown in FIG. 2, buffer tank 201 can be a 10,000 gallon tank that store buffer, and magnesium tank 202 can be a 10,000 gallon tank that stores magnesium.

The product solution can be pumped to the struvite reactors 159 and 160 using pump 156. Struvite is precipitated in the struvite reactors 158 and 160. In this embodiment, 20 tons of struvite can be precipitated per day. The struvite can have a density of about 60 pounds per cubic foot. While particular volumes are mentioned, the process can be scaled to various volumes.

Figure 3:
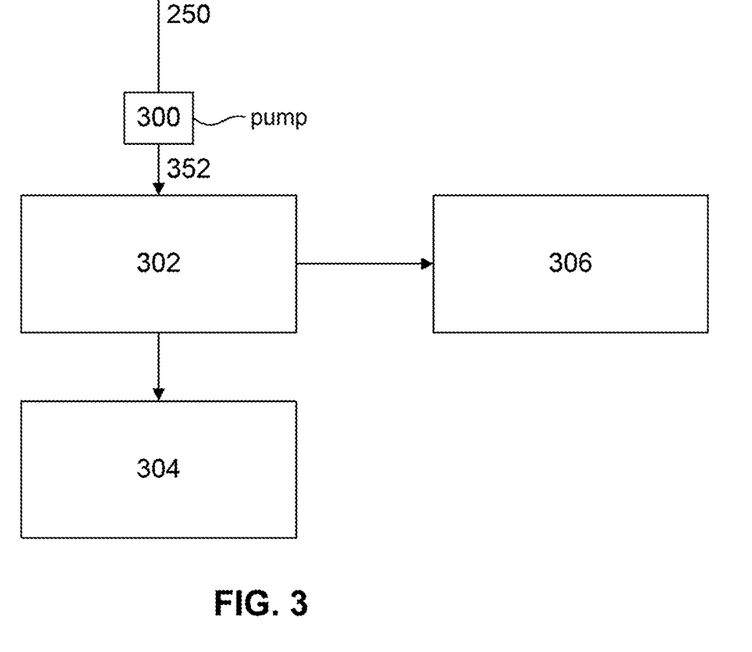
FIG. 3 is a flow chart corresponding to an exemplary process for separating feedstock.

FIG. 3 shows an exemplary process flow chart corresponding to step 300 shown in FIG. 1. In some embodiments, pump 300 pumps digestate 250 to separator 302. Separator 302 separates digestate 250 into a first solids fraction 304 and first filtrate 306.

In some embodiments, separator 302 is a vacuum filter. In some embodiments, the vacuum filter is a horizontal belt. In some embodiments, the vacuum filter is a rotary table.

Figure 4:
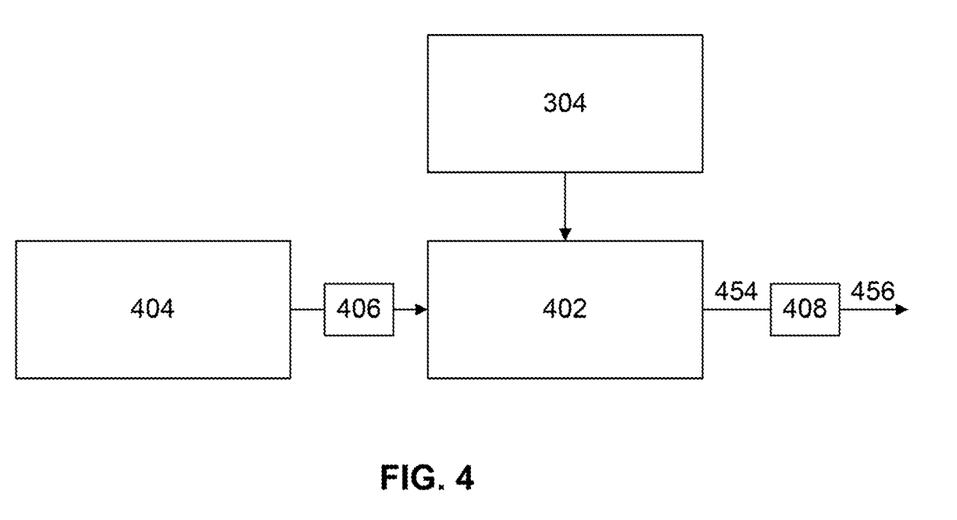
FIG. 4 is a flow chart corresponding to an exemplary process for adding high solids to the solids tanks.

FIG. 4 shows an exemplary process flow chart corresponding to step 400 shown in FIG. 1. Solids fraction 304 is moved to one or more solids tanks 402. Pump 406 pumps acid from acid tank 404 into solids tank 402.

Figure 5:
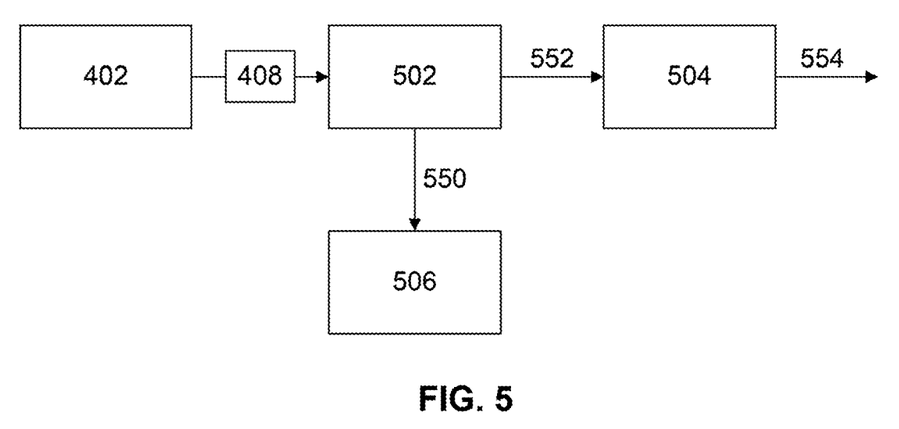
FIG. 5 is a flow chart corresponding to the separating the slurry step.

FIG. 5 shows an exemplary process flow chart corresponding to step 500 shown in FIG. 1. Pump 408 pumps a slurry from solids tank 402 to a separator 502. Separator 502 separates the slurry into a second solids fraction 504 and a second filtrate 506.

In some embodiments, separator 502 is a vacuum filter. In some embodiments, the vacuum filter is a horizontal belt. In some embodiments, the vacuum filter is a rotary table. In some embodiments, separator 502 is the same as separator 302 shown in FIG. 3. In some embodiments, second solids fraction 504 comprises a composition suitable for use as a soil amendment. In some embodiments, separator 502 is the same separator as separator 302 shown in FIG. 3. In some embodiments, separator 502 is a different separator from separator 302 shown in FIG. 3.

Figure 6:
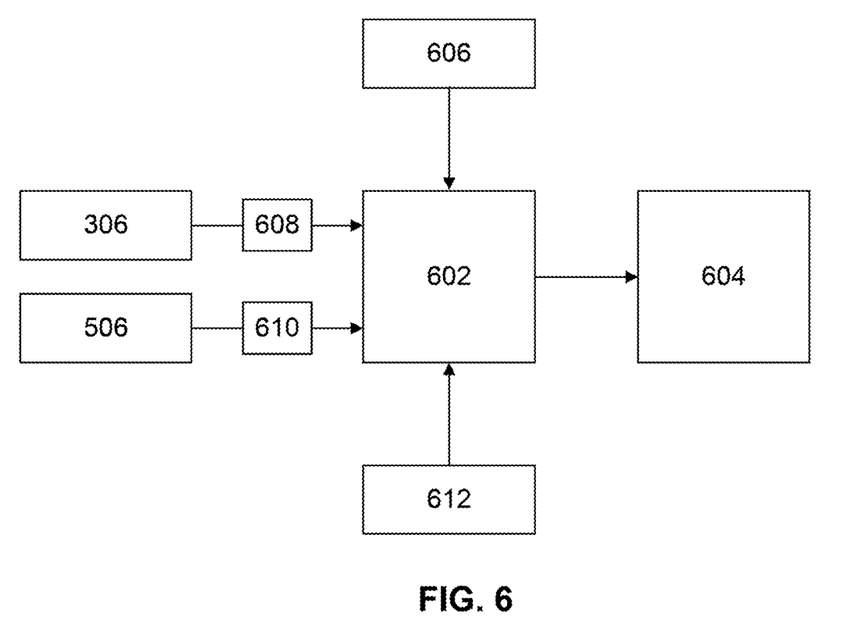
FIG. 6 is a flow chart corresponding to the mixing the first filtrate with the second filtrate step.

FIG. 6 shows an exemplary process flow chart corresponding to step 600 shown in FIG. 1. Pumps 608 and 610 pump the first filtrate 306 and second filtrate 506, respectively, into dosing tank 602. First filtrate 306 and second filtrate 506 are mixed in dosing tank 602 to form a product solution. In some embodiments, buffer from buffer tank 606 is added to dosing tank 602. In some embodiments, magnesium from magnesium tank 612 is added to dosing tank 602. In some embodiments, the product solution is moved to struvite reactor 604. In some embodiments, struvite is precipitated in struvite reactor 604.

Figure 7:
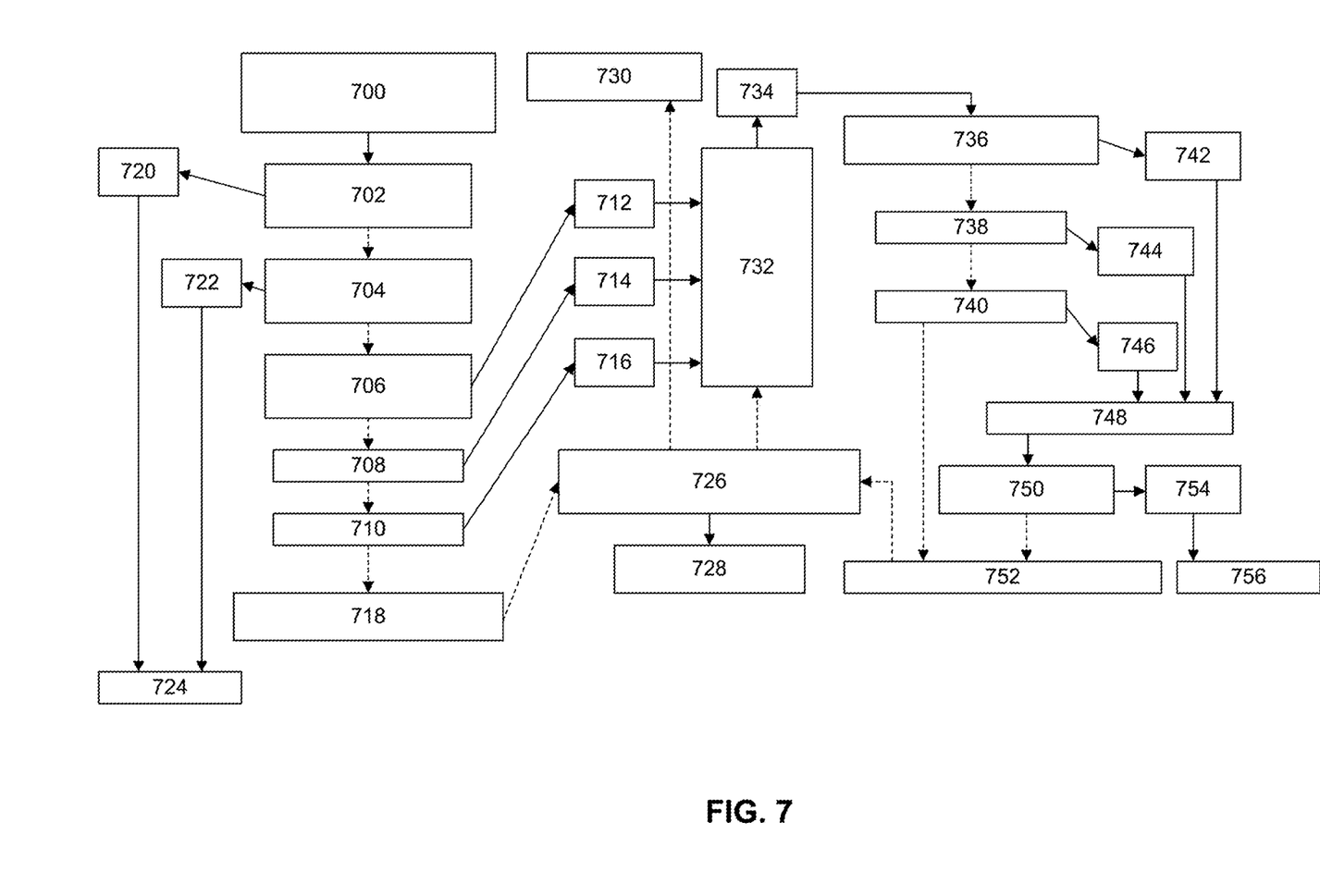
FIG. 7 is a flow chart for an exemplary process for forming product solution.

FIG. 7 shows a process flow chart corresponding to another embodiment of the invention. The process as shown in FIG. 7 has a capacity of about 200,000 gallons per day with a 6-8 hour extraction period per batch. The feedstock is provided and anaerobically digested at step 100 to produce a digestate. In some embodiments, the feedstock has the same composition as the feedstock in the process shown in FIG. 1. The digestate is then fed to a first filter 702. The remaining slurry leaving first filter 702 passes to a second filter 704. Solids leaving filters 702 and 704 move to storage locations 720 and 722, respectively. The solids in storage locations 720 and 722 may be used as a soil amendment 724. The slurry leaving second filter 704 moves sequentially through third filter 706, fourth filter 708, and fifth filter 710. In some embodiments, first filter 702 and second filter 704 are each an internally-fed rotary screen filter with a 4 mm to 6 mm screen. In some embodiments, third filter 706, fourth filter 708, and fifth filter 710 are each spiral water filters providing filtration of 100 μm, 50 μm, and 10 μm, respectively.

The phosphorus rich, high solids streams leave filters 706, 708, and 710 as solids slurries 712, 714, and 716. Each of solids slurries 712, 714, and 716 move to at least one acid extraction tank, shown as 732. The liquid leaving filter 710 moves to filtrate buffer storage tank 718. The liquid in buffer storage tank 718 may be used as needed in one or more struvite reactors, shown as 726. Struvite 728 leaves the struvite reactor 726 at a rate of about 20 tons per day at a density of about 60 pounds per cubic feet.

Slurry 734 leaves acid extraction tank 732 and moves to sixth filter 736, seventh filter 738, and eighth filter 740. In some embodiments, filters 736, 738, and 740 have the same specifications as filter 706, 708, and 710, respectively. The liquid leaving filter 740 moves to at least one acid storage tank 752. The solid slurries 742, 744, and 746 leaving filters 736, 738, and 740, respectively, move to mixing tank 748. In some embodiments, mixing tank 748 is a coagulation-flocculation tank. Following coagulation and flocculation, the slurry moves to a ninth filter 750 that separates the slurry into an acid liquid stream that moves to acid storage tank 752 and a phosphorus lean solids stream 754 that can be added as a soil amendment 756. Acid solution from acid tank 752 can be added to struvite reactors 726 as needed. Excess water may leave the struvite reactor and move to the recycle water 730.

As used herein, "about" may refer to plus or minus 10% of the indicated number. For example, "about 10" may mean from 9-11.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "or," as used herein, is inclusive; more specifically, the phrase "A or B" means "A, B, or both A and B." Exclusive "or" is designated herein by terms such as "either A or B" and "one of A or B," for example. The indefinite articles "a" and "an" and the definite article "the" to describe an element or component means that one or at least one of these elements or components is present, unless otherwise stated in specific instances.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about."

Directional terms as used herein—for example up, down, right, left, front, back, top, bottom—are made only with reference to the figures as drawn and are not intended to imply absolute orientation.

The breadth and scope of the present disclosure should not be limited by any of the above-described exemplary embodiments, but should be defined only in accordance with the following claims and their equivalents.

What is claimed is:

1. A process for forming a product solution from poultry waste, comprising:
   providing a feedstock that is greater than 80 percent poultry waste,
   anaerobically digesting said feedstock to produce a digestate having a solids content of about 5 to about 15 percent by weight;

separating said digestate into a high solids, phosphorus rich fraction; and a nitrogen rich first filtrate that has a basic pH;

adding the high solids, phosphorus rich fraction to an acid solution with stirring to form a slurry having a pH of between about 3.5 and about 5.0;

separating said slurry into a second solids fraction and a second filtrate;

clarifying said first filtrate to form a first centrate;

clarifying said second filtrate to form a second centrate; and mixing said first centrate with said second centrate to form said product solution.

2. The process of claim 1, wherein said first filtrate has a pH of between about 8 and about 9.

3. The process of claim 1, wherein said high solids fraction has a solids content of at least 15% solids and the first filtrate has a solids content of at most 2% solids.

4. The process of claim 1, wherein said second filtrate comprises orthophosphate and excess magnesium.

5. The process of claim 1, further comprising classifying components of said digestate based on particle size distribution of the components.

6. The process of claim 5, wherein:
following the classification of the components, the slurry is separated into two or more streams, and
at least one of the two or more streams comprises particles having an average diameter of less than or equal to 100 μm.

7. The process of claim 1, wherein one or more of rotary and forward pressure filtration is employed to separate and classify said digestate into at least one high solids, phosphorus rich fraction; and a nitrogen rich first filtrate.

8. The process of claim 7, wherein said one of rotary and forward pressure filtration employs one or more of a rotary screen, rotary filter, a membrane filter, and a filter press.

9. The process of claim 1, wherein one or more of rotary and forward pressure filtration is employed to separate and classify said slurry into at least one second solids fraction and a second filtrate.

10. The process of claim 9, wherein said rotary and forward pressure filtration employs a rotary screen, rotary filters, a membrane filter or a filter press.

11. The process of claim 1, wherein said high solids, phosphorus rich fraction and said second solids fraction are at least partially dried and are suitable for use as a soil amendment.

12. The process of claim 11, wherein said second solids fraction is phosphorus lean.

13. The process of claim 1, wherein said acid solution comprises one of sulfuric acid, citric acid, acetic acid, oxalic acid, phosphoric acid, carbonic acid, hydrochloric acid, nitric acid, or a combination thereof.

14. The process of claim 13, wherein said acid solution comprises sulfuric acid.

15. The process of claim 1, wherein said first centrate is a buffer liquid and said second centrate is an acid liquid.

16. The process of claim 15, wherein the solids level in said second centrate is less than 0.1% total suspended solids.

17. The process of claim 1, further comprising stirring the slurry for about 4 to about 24 hours prior to separating the slurry.

18. The process of claim 1, wherein the mixing step further comprises adding a buffer solution.

19. The process of claim 1, wherein said process further comprises adding at least one of said buffer solution, said acid solution, and said product solution to a struvite reactor to precipitate struvite.

20. The process of claim 1, wherein the process is a continuous, semi-continuous, or batch process.

21. A process for forming a product solution from poultry waste, comprising:
forming an admixture having a solids content, wherein said admixture comprises greater than 80% poultry waste;
maintaining the temperature, pH, and concentration of said admixture at conditions suitable for anaerobic digestion;
producing an anaerobic digestate from said admixture, said digestate having a solids content of about 5 to about 15 percent by weight;
substantially separating said digestate into a high solids, phosphorus rich fraction and a first filtrate that is nitrogen rich, has a basic pH;
adding the high solids, phosphorus rich fraction to an acid solution with stirring to form a slurry having a pH of between about 3.5 and about 5.0;
substantially separating said slurry into a second solids fraction and a second filtrate;
clarifying said first filtrate to form a first centrate;
clarifying said second filtrate to form a second centrate; and
mixing said first centrate with said second centrate to form said product solution.

22. The process of claim 21, further comprising classifying components of said digestate based on particle size distribution of the components.

23. The process of claim 22, wherein:
following the classification of the components, said digestate is separated into two or more streams, and
at least one of the two or more streams comprises particles having an average diameter of less than or equal to 100 μm.

* * * * *

UNITED STATES PATENT AND TRADEMARK OFFICE
CERTIFICATE OF CORRECTION

| | | |
|---|---|---|
| PATENT NO. | : 11,053,173 B2 | Page 1 of 1 |
| APPLICATION NO. | : 16/487742 | |
| DATED | : July 6, 2021 | |
| INVENTOR(S) | : Freitas | |

It is certified that error appears in the above-identified patent and that said Letters Patent is hereby corrected as shown below:

On the Title Page

Column 1, Item (54), and in the Specification, Column 1, Line 1, delete "PROCESS" and insert --A PROCESS--.

In the Claims

In Column 16, Claim 21, Line 30, delete "substantially separating" and insert --separating--.

In Column 16, Claim 21, Line 37, delete "substantially separating" and insert --separating--.

Signed and Sealed this
First Day of March, 2022

Drew Hirshfeld
*Performing the Functions and Duties of the
Under Secretary of Commerce for Intellectual Property and
Director of the United States Patent and Trademark Office*